US011893043B2

United States Patent
Sengupta et al.

(10) Patent No.: US 11,893,043 B2
(45) Date of Patent: Feb. 6, 2024

(54) IDENTIFYING ASSOCIATED DATA OBJECTS

(71) Applicant: Salesforce, Inc., San Francisco, CA (US)

(72) Inventors: Nabarun Sengupta, Fremont, CA (US); Kusum Kanwar, Tiburon, CA (US); Saranyadevi Ganesan, Cambridge, MA (US); Sundar Veliah, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 363 days.

(21) Appl. No.: 16/748,672

(22) Filed: Jan. 21, 2020

(65) Prior Publication Data
US 2021/0224297 A1 Jul. 22, 2021

(51) Int. Cl.
*G06F 16/28* (2019.01)
*G06F 9/54* (2006.01)

(52) U.S. Cl.
CPC ............. *G06F 16/285* (2019.01); *G06F 9/54* (2013.01)

(58) Field of Classification Search
CPC ................................. G06F 16/285; G06F 9/54
See application file for complete search history.

(56) References Cited

U.S. PATENT DOCUMENTS

| 2009/0094104 | A1* | 4/2009 | Anuar | G06Q 30/0254 |
| | | | | 705/14.52 |
| 2013/0073632 | A1* | 3/2013 | Fedorov | G06Q 10/101 |
| | | | | 709/205 |
| 2016/0110794 | A1* | 4/2016 | Hsiao | G06F 18/214 |
| | | | | 705/26.7 |
| 2017/0220605 | A1* | 8/2017 | Nivala | G06F 16/282 |
| 2018/0218399 | A1* | 8/2018 | Rajaram | G06Q 30/0255 |
| 2018/0341871 | A1* | 11/2018 | Maitra | G06N 3/042 |
| 2019/0102364 | A1* | 4/2019 | Rochiramani | G06F 40/166 |
| 2019/0102404 | A1* | 4/2019 | Benedict | G06F 16/162 |
| 2022/0124411 | A1* | 4/2022 | Saxena | G06Q 30/0601 |

* cited by examiner

*Primary Examiner* — Apu M Mofiz
*Assistant Examiner* — Farhad Agharahimi
(74) *Attorney, Agent, or Firm* — Holland & Hart LLP

(57) ABSTRACT

A first data management system, which may be associated with a content management system (CMS), may receive an identifier for a content item. A content item may be an example of a picture, a blog post, an article, a video, an audio segment (e.g., a podcast) or other type of text or multimedia content. The first data management system may be configured to generate an object corresponding to the content item. The content object may be transmitted to a model corresponding to a second data management system. The model may be configured to identify relationships between data stored at the second data management system. The model may identify one or more data objects that are associated with the received content object, and return the data objects to the first data management system.

17 Claims, 10 Drawing Sheets

IDENTIFYING ASSOCIATED DATA OBJECTS

FIELD OF TECHNOLOGY

The present disclosure relates generally to database systems and data processing, and more specifically to identifying associated data objects.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In another example, a cloud platform may support a commerce platform, such as an ecommerce website. As such, a cloud platform may be configured to support one or more services, such as a CRM solution or a commerce platform. These services may be supported using separate computing systems, which may be adapted and configured for the specific services. Accordingly, features of one service may not integrate with the other service. However, in some scenarios, a feature configured for one service may be useful for another service.

DETAILED DESCRIPTION

Figure 1:
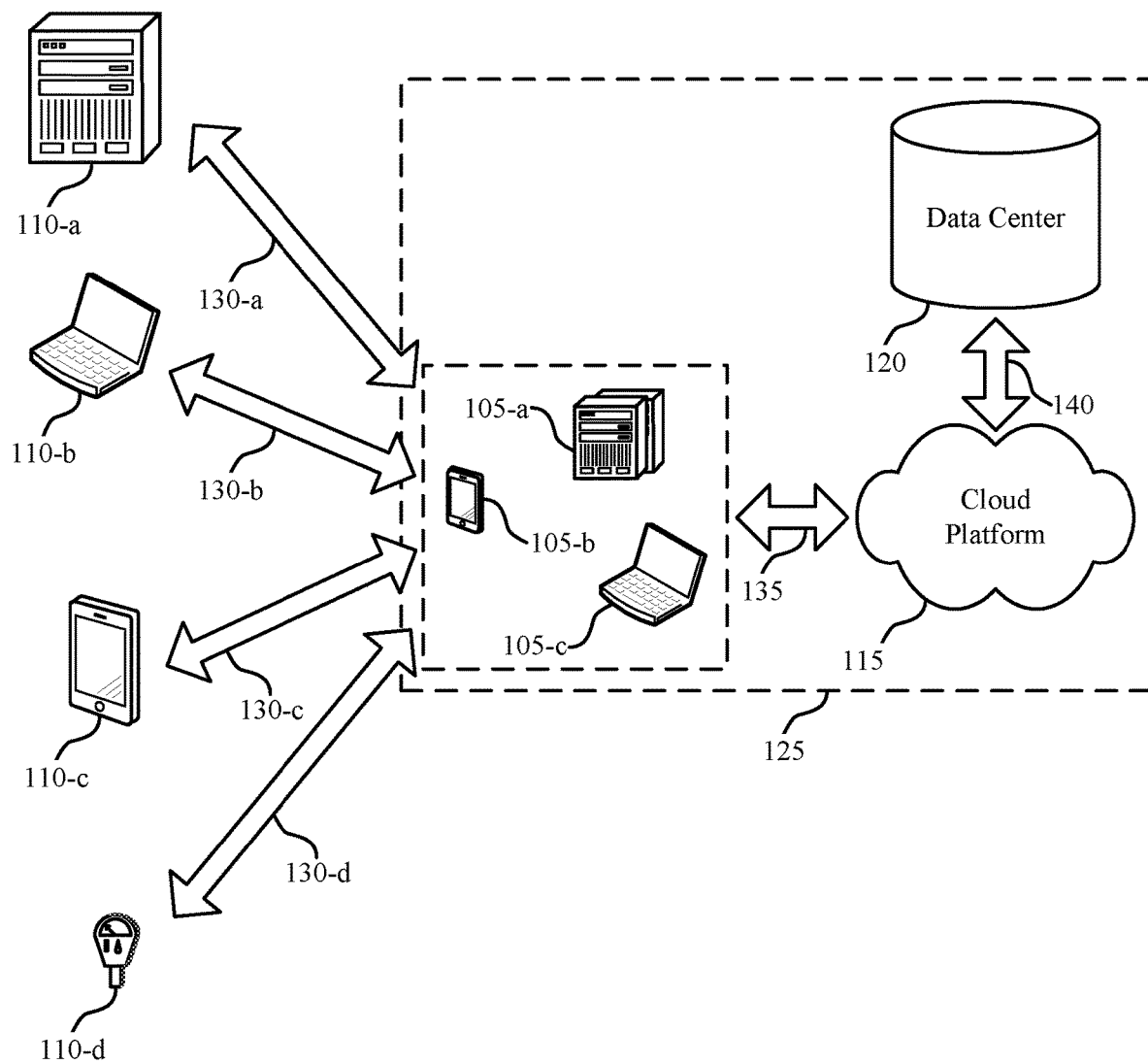
FIG. 1 illustrates an example of a system for data processing that supports identifying associated data objects in accordance with aspects of the present disclosure.

A cloud platform may support a content management system (CMS) that may be used for content distribution, marketing, advertising, etc. For example, a CMS may be used to distribute (e.g., via email, online advertising, mobile advertising, etc.) content relating to products or services. The CMS may monitor various metrics associated with different distributed content, such as open rate and click rate, and automatically update distribution metrics, content characteristics, etc. based on the monitoring of the distributed content. A CMS may also be used to schedule distribution of content relating to marketing campaigns over an extended time period, among other functions.

In addition to or alternatively to the CMS, a cloud platform may support a data management system. The data management system may store and update data related to various systems, such as an ecommerce system. For example, a data management system of the cloud platform may store and manage a dataset associated with various products or services offered at an ecommerce website as well as customer behavior data related to the products or services. The dataset may include product names, descriptions, pricing information, purchase history, etc. The customer behavior data may include customer purchase history, browsing history, etc. In some cases, the data management system may also infer or identify data based on the data set. For example, the data management system may classify customers into segments based on the purchase history and/or browsing data. Further, the data management system may infer relationships between products based on purchase history and associated customer data. In some cases, relationships between customers and/or products may be identified using machine learning techniques. For example, the data management system may support a model for identifying product relationships and a model for identifying customer relationships. These models may be used to provide product recommendations to customers during a browsing session.

Accordingly, the cloud platform may provide different features for different systems according to the functions of the respective system. However, in some cases, a feature configured for one particular system may be useful for aspects of another system. Utilization of a feature configured for one system in another system may be difficult since the feature is configured based on the data of a particular system. In the example of a model that identifies relationships between data in a particular system, utilization of the model for another system may be inaccurate or error-prone since the model is trained on the data of the target system. That is, the model may not have a basis for identifying relationships for another system since it is not trained using feedback in the first system.

According to aspects of the disclosure, a first data management system, which may be associated with a CMS, may receive an identifier for a content item. A content item may be an example of a picture, a blog post, an article, a video, an audio segment (e.g., a podcast) or other type of text or multimedia content, and the identifier for the content item may be a link, for example. The first data management system may be configured to generate an object corresponding to the content item. The content object may include content fields corresponding to characteristics of the content item. The content object may be transmitted to a model corresponding to a second data management system. The second data management system may be associated with a data management system for an ecommerce system. The model may be configured to identify relationships between data stored at the second data management system. For example, the model may be an example of a model that identifies relationships between products based on product data and/or customer data (e.g., purchase history and/or browsing data), as described above. The model may identify one or more data objects that are associated with the received content object, and return the data objects to the first data management system.

Thus, the first data management system may be able to utilize a model configured for the second data management system to identify data of the second data management system that may be related to the content received at the first data management system. These techniques may be useful in various scenarios. For example, as the first data management system may be associated with a CMS and the second data management system associated with an ecommerce system, the identified data of the second data management system may correspond to products identified as relating to received content (e.g., a blog post, picture, etc.). Accordingly, when the content is distributed via email, website, etc., then the products may be linked to the content. Thus, an efficient technique for linking products to content is provided.

Further, in some examples, the model associated with the second data management system may identify categories or topics associated with the identified data objects. In some cases, the categories or topics may be filtered based on confidence scores generated by the model. In other cases, a user may select or filter identified data objects using the categories or topics. The topics or categories, as well as the identified data, may be linked to the content as it is distributed to various end users (e.g., customers). Accordingly, when a user views the content item, the user may be able to identify the data objects (e.g., products) that are associated with the content item.

Aspects of the disclosure are initially described in the context of an environment supporting an on-demand database service. Aspects of the disclosure are further described with respect to system diagrams illustrating features for identifying associated data objects and a process flow diagram. Aspects of the disclosure are further illustrated by and described with reference to apparatus diagrams, system diagrams, and flowcharts that relate to identifying associated data objects.

FIG. 1 illustrates an example of a system 100 for cloud computing that supports identifying associated data objects in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Cloud platform 115 may support various different systems, such as a content management system and/or a commerce system (e.g., an ecommerce system). In some cases, the different systems may be associated with different data stores of the data center 120. The data stores may be examples of different logical data stores, physical data stores, or a combination thereof. Further, each respective system that may be supported by the cloud platform 115 may be configured with separate services. For example, a data management platform of a commerce system supported by the cloud platform 115 may include one or more models for identifying relationships between data. These models may be specifically configured to function with the systems and data of the commerce system. In some cases, these models may be useful for other systems supported by the cloud platform 115.

Configuration of a model for utilization with data of a new system may be time consuming, may require specific technical expertise, and may utilize significant computing resources. Such models may be trained on large amounts of data such that the models are configured to interact with the specific data. The training process may utilize significant processing and memory resources. Further, the training process may not be "complete" as some particular types of models are continually "learning" through further utilization and feedback. As such, training a model for a separate data set and system may problematic, when processing and memory resources may be useful for other features.

Aspects of the disclosure described herein may solve these problems by providing techniques to use a model by a first data management system (e.g., associated with a first system supported by the cloud platform 115) of the data center 120, where the model is configured for a second data management system. The second data management system may be associated with the data center 120 and supported by the cloud platform 115. In some examples, the first data management system is associated with a CMS, and the second data management system is associated with a commerce system. The first data management system may be configured to manage various content and distribution of such content. In some cases, the first data management system may generate a content object based on an item of content (e.g., a content item). The content object may be generated in accordance with requirements of a model associated with the second data management system. The content object may be transmitted to the model (e.g., using an application programming interface (API)), where the model identifies a data object of the second data management system that may be identified as being associated with the content item. The content item may be distributed according to the configurations of the CMS, and the identified data objects may be linked or otherwise associated with the distributed content. In one example, the identified data objects correspond to a product, and the content item may be distributed with links to purchasing the product. Thus, the described techniques may be utilized to efficiently identify relationships between content and data and distribute the content with the data being linked. Further, these techniques may be used such that the first or second data management system may not require specialized configuration. That is, the model associated with (e.g., configured for) the second data management system may not be reconfigured for the first data management system, which may avoid utilization of significant processing and memory resources.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In one example utilization of the described techniques and systems, a marketing administrator or other user may create or identify some content for distribution. The user may provide a link to the content to the CMS supported by the cloud platform 115. A data store of the CMS may configure the content as a content object. The content object may include various parameters with values corresponding to characteristics of the content. The CMS may transmit the content object to a model associated with a separate data store. The model may identify a set of products that may be associated with the content as well as one or more topics or categories of products. The model (e.g., second data management system) may return the identified information to the CMS, which displays the information to the user. The user may select or filter the received information, and the selected information may be linked to the content for distribution. When the content is distributed, the information may be displayed to an end user, which may select or navigate to a page associated with the content. As such, the CMS may be used to analyze content, identify associated products, and distribute the content with the associated products.

Figure 2:
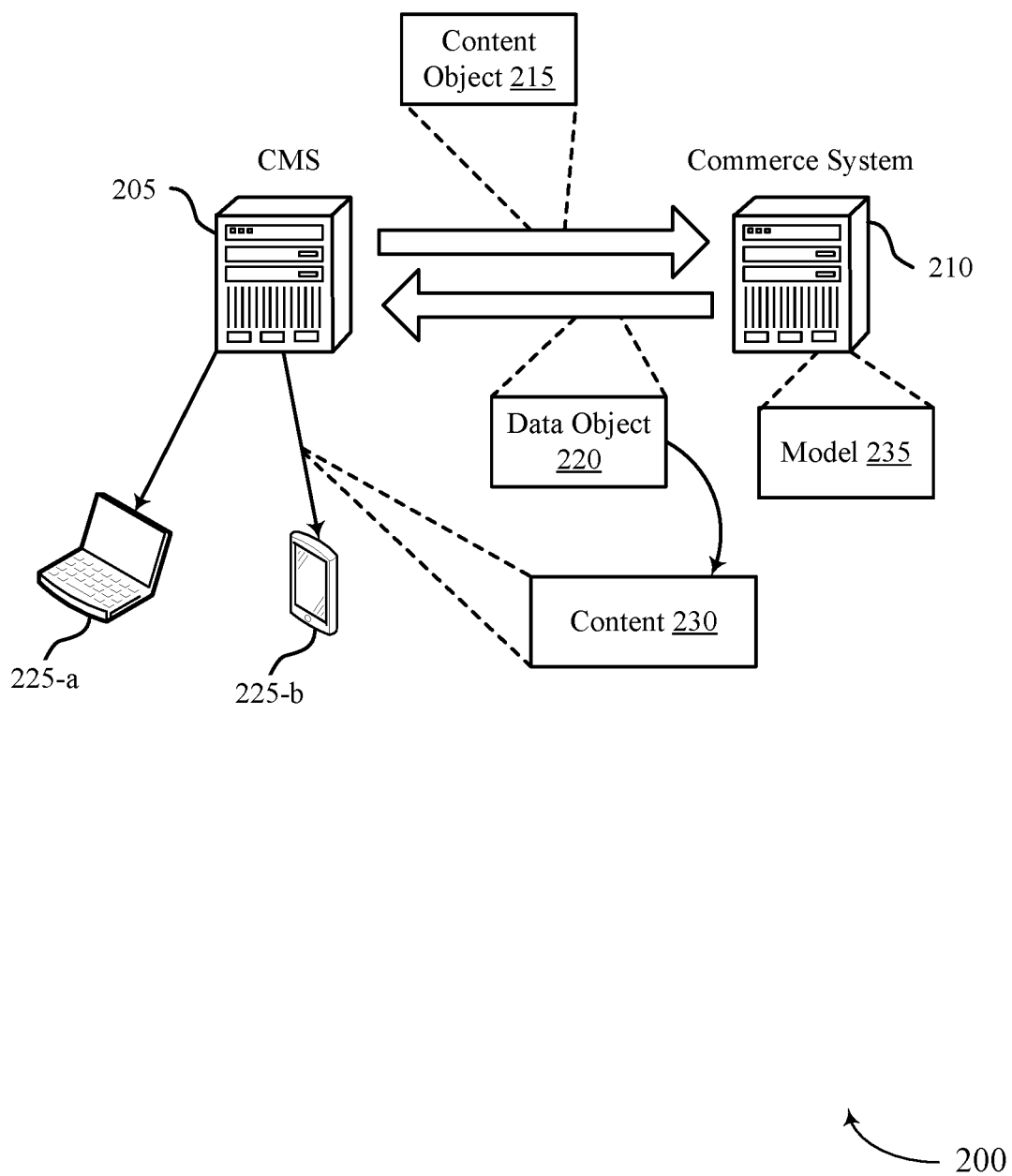
FIG. 2 illustrates an example of a system that supports identifying associated data objects in accordance with aspects of the present disclosure.

FIG. 2 illustrates an example of a system 200 that supports identifying associated data objects in accordance with aspects of the present disclosure. The system 200 includes a first data management system 205 and a second data management system 210, which may correspond to various components of the data center 120 and cloud platform 115 of FIG. 1. The first data management system 205 and/or second data management system 210 may be managed by various computing systems such as one or more data servers. In some examples, the first data management system 205 is associated with a content management system. More particularly, the first data management system 205 may receive, store, and manage various content items for a CMS. The CMS may manage the intake, storage (e.g., at the first data management system 205) and distribution of content to a plurality of users via user devices 225. That is, the CMS may be used by a firm or organization (e.g., cloud client 105) to manage the distribution of content to users, which may be customers, targeted customers, or the public, via various types of user devices 225.

In some examples, the second data management system 210 may be associated with a commerce system, such as a system that supports an ecommerce system. That is, an ecommerce system may store various data objects in the second data management system 210. The data objects may correspond to products, services, customers, etc. For example, a data object corresponding to a product may include data such as product identifier, price, description, features, purchase history, etc. A data object corresponding to a user may include data such as browsing history, purchase history, customer identifier, identifier, inferred or received customer profile characteristics, etc. Customer profile characteristics may include data such as age, profession, gender, relationship status, interests, etc.

A model 235 may be associated with the second data management system 210 and configured to identify relationships between data objects stored at the second data management system 210. The model 235 is configured to function with the data of the second data management system 210. The configuration may include training the model 235 on the data of the second data management system 210, providing feedback of model output associated with data of the second data management system 210, etc. In some cases, the model 235 may be a recommendation system that identifies that products may be related and recommends the related products (e.g., data objects) to a user. The relationships may be identified based on purchase history of products, characteristics of users, browsing history, etc. For example, the model 235 may identify that users that have characteristics (e.g., age, gender, geographic location) and have purchased a first product may be likely to purchase a second different product. As such, the model 235 may recommend the second product to a user that has purchased the first product that has the same or similar characteristics.

The model 235 may use various artificial intelligence machine learning techniques to identify the relationships. In some cases, the model 235 is a classification engine that classifies data objects (e.g., products) into one or more categories. Further, the model 235 may monitor various user or subscriber behavior to classify users into one or more categories or segments. The model 235 may identify relationships or scenarios in which a recommendation of a particular data object or product may increase the likelihood of the user of viewing or purchasing the product. For example, the model 235 may identify that users or subscribers that bought one particular item are likely to by another particular item. The model 235 may also identify relationships between attributes of products, relationships between user actions (e.g., adding a product to a cart), relationships between views of items, etc. In some examples, the model 235 may utilize image detection classification techniques to classify images into one or more categories. In some examples, the images may be images of products offered at the ecommerce platform.

According to aspects of the disclosure herein, the first data management system 205 may be configured to leverage the model 235 associated with the second data management system 210. A user may input or identify a content item 230 for the first data management system. The content item may be textual (e.g., a blog, email text, offer, etc.), an image (e.g., image associated with a blog, an image included in an email, an image associated with an offer, etc.), audio, video, or a combination of these. The user may input or identify the content item 230 using a link to the content item. In some cases, the link is a uniform resource locator (URL) associated with the content item 230. In other cases, the user may upload the content item 230 to the CMS. The first data management system may generate a content object 215 based on the received content item 230. The content object 215 may include one or more content fields corresponding to characteristics of the content item. The field may include a description, text, images, etc. corresponding to the content item 230. The content object 215 may be generated in accordance with the model 235 associated with the second data management system 210. For example, the model 235 may be accessible via an API and the content object 215 may be generated in accordance with configurations set forth by the API for the model 235.

The content object 215 may be transmitted to the model 235 via the API (e.g., using an API request), and the model 235 may process the content object 215 to identify related data objects of the second data management system 210. For example, the processing may include cleaning the data of the content object 215, formatting the data, featurizing or vectorizing the data, using a word embedding function, natural language processing (NLP), etc. The model 235 may ingest the data and identify data objects that may be associated with the content item 230 based on the model's configuration, training state, and input. For example, the model 235 may identify set products that may be associated with features of the content item 230. In some cases, the model identifies confidence scores associated with each identified data object, and some of the data objects may be filtered by the model 235 and/or the system associated with the model 235 based on the confidence scores.

The API may return a response to the API request including the content object 215. The response may include an identification of one or more data objects 220 that are identified by the model 235 as being associated with the content object 215 and the content item 230. The association may be based on features of the content item being similar to features of the data object. The model 235 may also identify one or more categories of data objects that may be associated with the content. In one example, a picture of a camping trip is uploaded to the CMS as content item 230, and the picture is used as a characteristic of the generated content object 215 for analysis by the model 235. Using various techniques, the model 235 may identify a set of categories (e.g., topics or tags), a set of content objects (e.g., products), etc. of the second data management system 210. More particularly, the model 235 may identify that the image includes a picture of a tent, a person wearing a hat, a cooler/ice chest, etc. and identify products (e.g., a tent, hat, cooler) from the second data management 210 system as being associated with the image. The model 235 may also identify categories or tags including camping, hat, tent, cooler, etc.

The identified information (e.g., categories and data objects) may be returned as a response to the API request to the first data management system 205. The returned information may be in the form of a JavaScript Object Notation (JSON) response. The response may be parsed and populated in a user interface component in association with the uploaded/identified content item 230. There, the user may select or reject information (e.g., data objects such as product and/or tags). Selection of the information may cause the selected information to be linked to the content item. Subsequently, when the content item 230 is distributed to end users via user devices 225, the identified content objects/information may be associated with the distributed content item 230. Returning to the camping image example described above, the user may select the hat and tent products, and the image may be used in a blog post about camping. When an end user views the blog post, the hat and tent products may be displayed and/or selectable at the blog. More specifically, product page snippets may be viewable nearby the image or elsewhere on the blog post. In some cases, the product pages are automatically linked in a portion of the blog post. Upon selection of one of the products, the user may be directed to a webpage associated with the second data management system 210 (e.g., managed by the ecommerce system).

Figure 3:
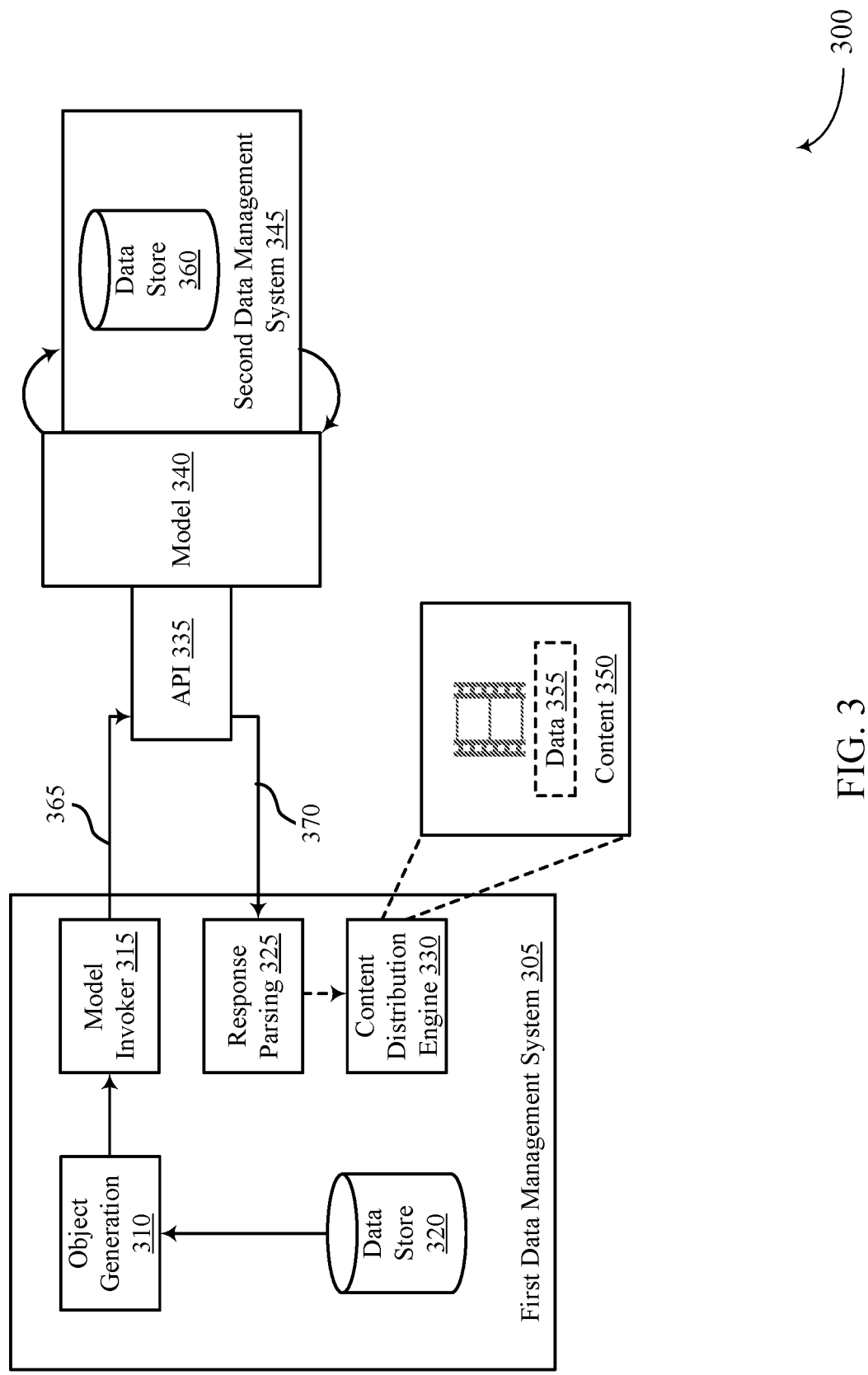
FIG. 3 illustrates an example of a system that supports identifying associated data objects in accordance with aspects of the present disclosure.

FIG. 3 illustrates an example of a system 300 that supports identifying associated data objects in accordance with aspects of the present disclosure. The system 300 includes a first data management system 305 and a second data management system 345, which may be examples of the corresponding components of FIG. 2. The first data management system 305 may be associated with a content management system, and the second data management system 345 may be associated with a commerce system.

The first data management system 305 may include a data center 320, which may store and manage data storage for the services provided by the first data management system 305. In the example that the first data management system 305 is associated with the CMS, the data center 320 may store various content items and metadata associated with the content items. A content distribution engine 330 may manage distribution of content to various users via email, web sites, push notifications, etc., in accordance with a configured or optimized schedule. The content distribution engine 330 and/or related components may monitor feedback associated with distributed content, such as click-rate, open-rate, etc.

An object generation component 310 may generate content objects based on content items of the data center 320. For example, a user may create or identify a flyer for distribution. The object generation component 310 may generate a content object based on the features of the flyer, including text images, etc. As such, the content object may include a content field corresponding to characteristics of the content item. For example, the content object includes an image field that includes at least an identifier for the image, a text field including the text of the flyer, etc. In some cases, the content object is generated in accordance with configurations of an API 335 used to access a model 340 associated with the second data management system 345. In the cases where the second data management system supports an ecommerce platform, the model 340 may be configured to analyze data objects corresponding to products. As such, the generated content object may correspond to a data object of a product. That is, the content object may be generated such that it resembles a data object of a product so that the model 340 may ingest the content object to identify the relationships.

A model invoker 315 of the first data management system 305 may transmit a request to the API 335 for the model 340. The request may include the generated content object. The request may include other parameters such as filtering conditions for the model 340. The model may be an example of the model 235 as described with respect to FIG. 2. The model 340 may be configured to analyze data stored at the data store 360 of the second data management system 345 and events occurring in association with such data. In the example where the second data management system 345 is associated with a commerce platform (e.g., a commerce cloud), the data store 360 may store customer and product/service data. The model may be configured to identify relationships between data objects and present the relationships as recommendations to users browsing a website supported by the commerce system. Generally the model 340 may receive product and/or user data via the API 335.

As described herein, the API 335 receives the request from the first data management system 305, where the request includes the content object. The model 340 may process the content object to identify one or more data objects that may be associated with the characteristics of the content object. That is, the model uses its trained behavior to identify a relationship between the content object and one or more data objects of the data store 360. The model 340 may also identify one or more topics associated with the content object and/or the identified data objects. The API 335 may return the identified information (e.g., data objects and topics) to the first data store as a response 370 to the request 365. In some cases, the response 370 is a JSON response, which is parsed by a response parsing component 325. That is, the response may be a serialized version of a JSON object, which may be deserialized at the first data management system 305 for parsing. Further, the data objects may include attributes with values that correspond to product characteristics. For example, the data object may include an image attribute with an image of the product, a description attribute including a description of the product, pricing information, etc. The response parsing component may identify characteristics of the response to be displayed to a user. In some cases, the parsing component 325 may filter the information based on confidence scores identified by the model. For example, the parsing component 325 may be configured to discard information with confidence scores below a threshold. Further, the information may be displayed for selection by a user. For example, a user interface (UI) container may display the results generated by the model 340 including topics and/or products (e.g., data objects). The user may select a number of products and/or topics that may be subsequently associated with the content item 350 as data 355 for distribution by the content distribution engine 330.

Accordingly, when the content distribution engine distributes the content item 350, the identified data 355 or information (e.g., tags) may be linked to the content. Thus, a user may receive or access the content item 350 and click on the recommended data 355. The user may then be redirected to the commerce website that is associated with the recommended data (e.g., a product page). However, in some examples, the CMS may track any interaction with a content object or category linked to the distributed content item 350.

In some examples, a content item 350 may be updated by a user, marketing manager, etc. For example, the user may update an image or text of a blog post. In such cases, the first data management system 305 may detect the update and automatically transmit an updated content object corresponding to the updated content to the second data management system 345. The model may identify new data objects as being associated with the updated content item, and a user may select the new data objects. Thereafter, the distributed content may include the new content and the new data objects (e.g., new products). In the case where the content is a webpage, the webpages may be automatically update with the new content and data objects. In the case where the content is a distributed email, the emails may be linked to the new content and data objects. As such, even when the emails are transmitted prior to the updates, when the email is opened, the emails may be populated with the updated content and items. That is, when an email is opened, a request is transmitted to the CMS, and the CMS response with the latest version of the content and the data objects. As such, the content may be dynamically updated without resending emails.

Figure 4:
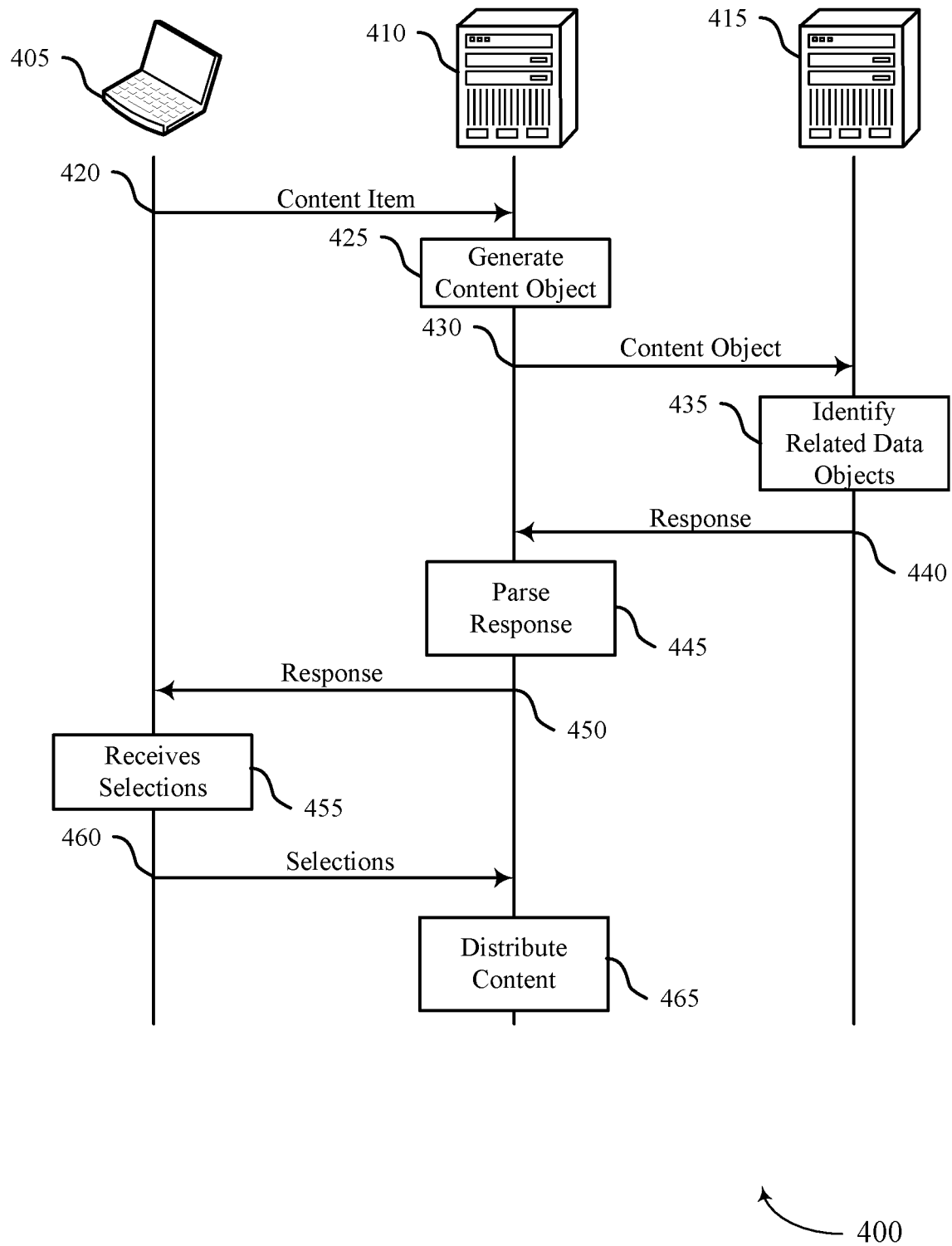
FIG. 4 illustrates an example of a process flow diagram that supports identifying associated data objects in accordance with aspects of the present disclosure.

FIG. 4 illustrates an example of a process flow diagram 400 that supports identifying associated data objects in accordance with aspects of the present disclosure. The process flow diagram includes a user device 405, a first data management system 410 and a second data management system 415, which may be examples of the corresponding devices of FIGS. 1 through 4.

At 420, the first data management system 410 may receive an identifier for at least one content item from the user device 405. A user of the device may input the identifier (e.g., a URL) for the content item, upload the content item, etc. The content item may include text, video, audio, images, or a combination thereof. At 425, the first data management system 410 may generate a content object based at least in part on the at least one content item. The content object may include one or more content fields corresponding to characteristics of the content item. For example, the content fields may include a title, text description, images, or other multimedia.

At 425, the first data management system may transmit, using an application programming interface, the content object to a model configured to identify relationships between data stored at the second data management system 415. At 435, the model associated with the second data management system 415 may identify one or more data objects as being associated with the at least one content item. The model may utilize machine learning or deep learning techniques and the model may be configured for and trained on the data of the second data management system 415.

At 440, the first data management system 410 may receive, from the second data management system 415, an identifier for at least one data object identified by the model of the second data management system as being associated with the at least one content item. At 445, the first data management system may parse the response (e.g., a JSON response) to identify characteristics to display to the user at the user device 405. At 450, the first data management system may cause display of at least a portion the response at the user device 405. At 455, the user device may receive selections of the displayed response and transmit the selections at 460 to the first data management system 410. At 465, the first data management system may distribute the content to various user devices, and the content may have the identified and selected data objects (in addition to topics, in some case) linked to the content. In some cases, the link comprises a redirect link which causes the user to be redirected to a product page associated with the data objects when the link is selected.

Figure 5:
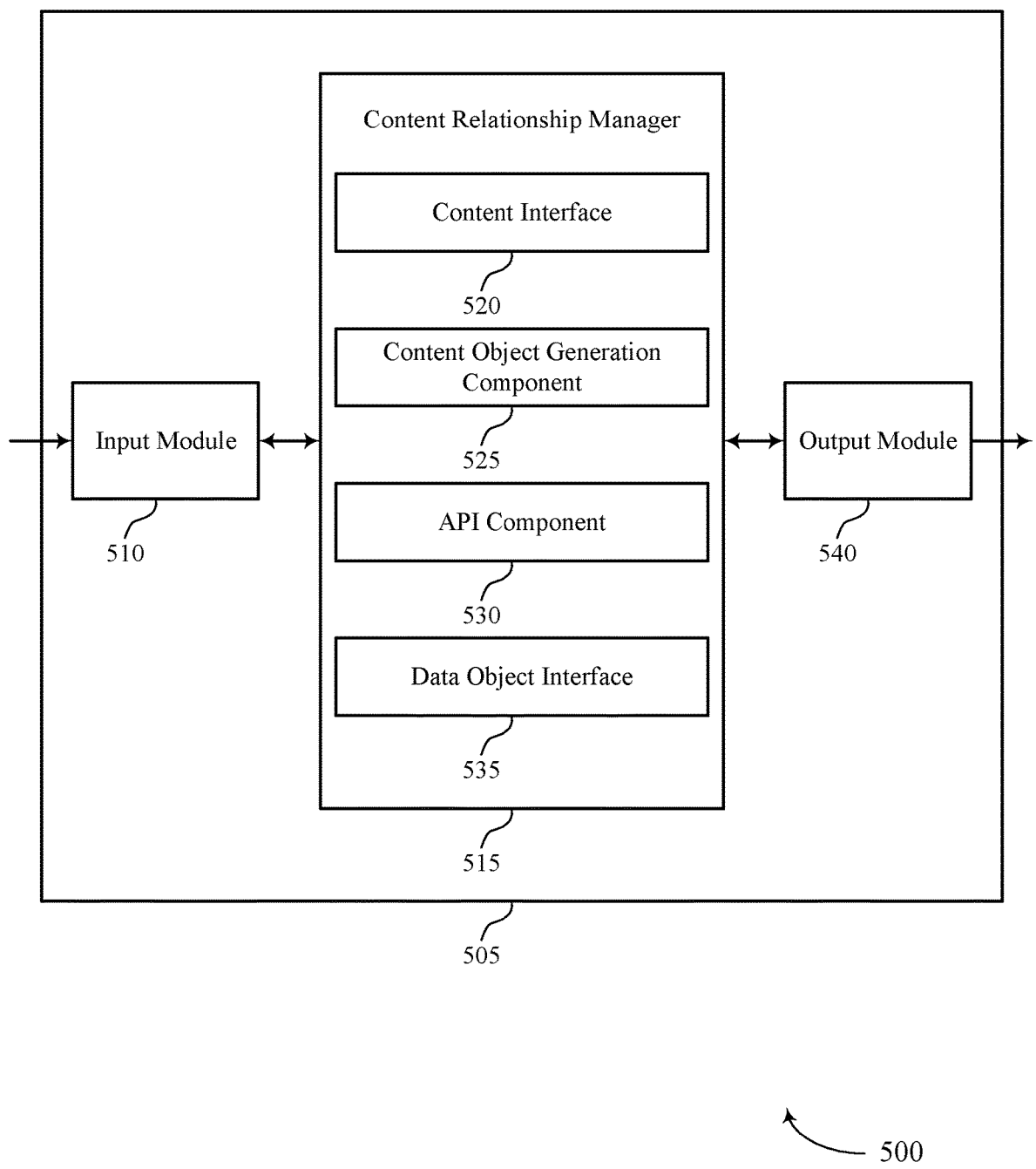
FIG. 5 shows a block diagram of an apparatus that supports identifying associated data objects in accordance with aspects of the present disclosure.

FIG. 5 shows a block diagram 500 of an apparatus 505 that supports identifying associated data objects in accordance with aspects of the present disclosure. The apparatus 505 may include an input module 510, a content relationship manager 515, and an output module 540. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the order response component 515 to support processing fulfillment using stateless APIs and complex classes. In some cases, the input module 510 may be a component of an input/output (I/O) controller 715 as described with reference to FIG. 7.

The content relationship manager 515 may include a content interface 520, a content object generation component 525, an API component 530, and a data object interface 535. The content relationship manager 515 may be an example of aspects of the content relationship manager 605 or 710 described with reference to FIGS. 6 and 7.

The content relationship manager 515 and/or at least some of its various sub-components may be implemented in hardware, software executed by a processor, firmware, or any combination thereof. If implemented in software executed by a processor, the functions of the content relationship manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The content relationship manager 515 and/or at least some of its various sub-components may be physically located at various positions, including being distributed such that portions of functions are implemented at different physical locations by one or more physical devices. In some examples, the content relationship manager 515 and/or at least some of its various sub-components may be a separate and distinct component in accordance with various aspects of the present disclosure. In other examples, the content relationship manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The content interface 520 may receive, at a first data management system, an identifier for at least one content item.

The content object generation component 525 may generate a content object based on the at least one content item, where the content object includes one or more content fields corresponding to characteristics of the content item.

The API component 530 may transmit, using an application programming interface, the content object to a model configured to identify relationships between data stored at a second data management system.

The data object interface 535 may receive, from the second data management system, an identifier for at least one data object identified by the model of the second data management system as being associated with the at least one content item.

The output module 540 may manage output signals for the apparatus 505. For example, the output module 540 may receive signals from other components of the apparatus 505, such as the order response component 515, and may transmit these signals to other components or devices. In some specific examples, the output module 540 may transmit output signals for display in a user interface, for storage in a database or data store, for further processing at a server or server cluster, or for any other processes at any number of devices or systems. In some cases, the output module 540 may be a component of an I/O controller 715 as described with reference to FIG. 7.

Figure 6:
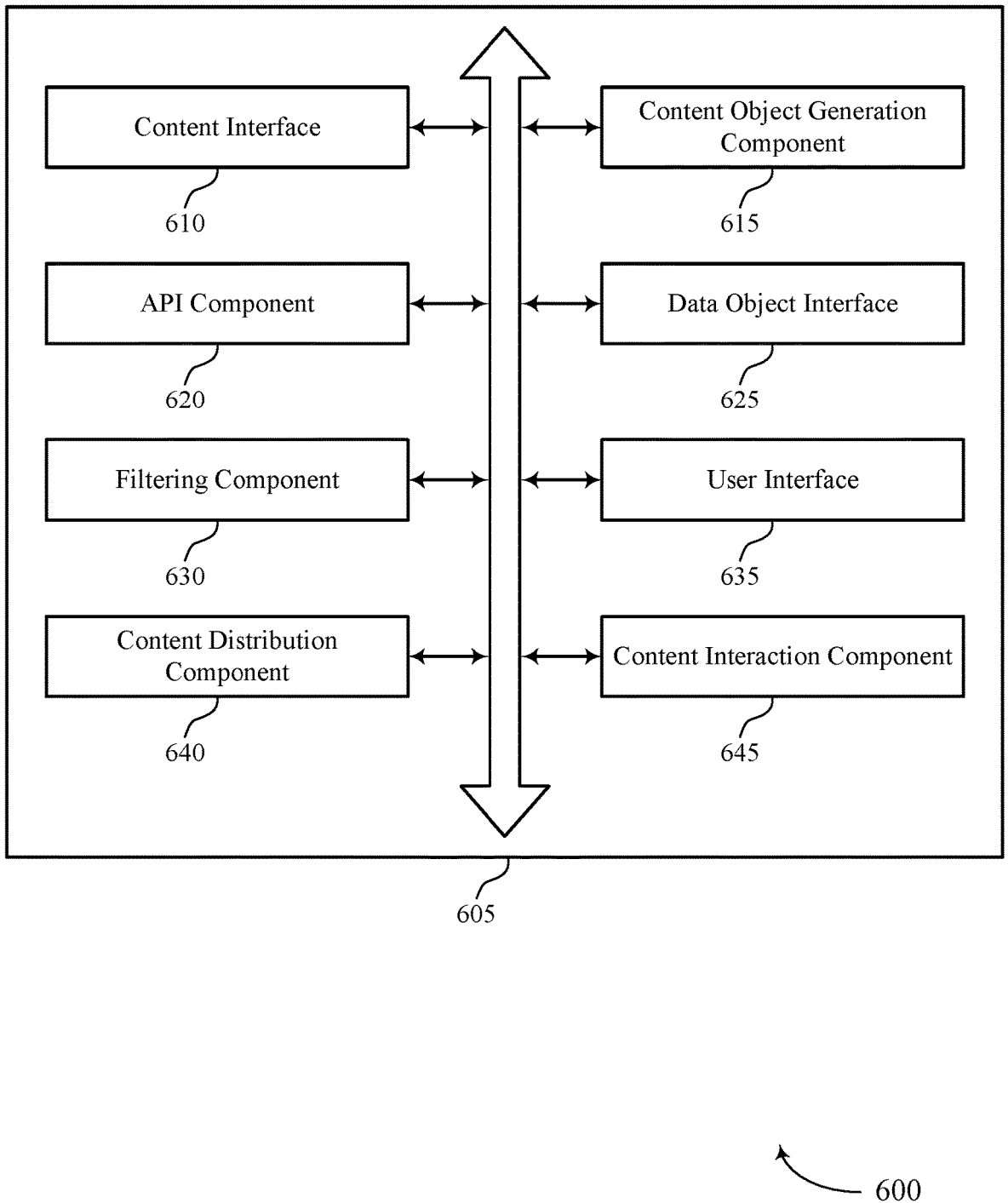
FIG. 6 shows a block diagram of a content relationship manager that supports identifying associated data objects in accordance with aspects of the present disclosure.

FIG. 6 shows a block diagram 600 of a content relationship manager 605 that supports identifying associated data objects in accordance with aspects of the present disclosure. The content relationship manager 605 may be an example of aspects of a content relationship manager 515 or a content relationship manager 710 described herein. The content relationship manager 605 may include a content interface 610, a content object generation component 615, an API component 620, a data object interface 625, a filtering component 630, an user interface 635, a content distribution component 640, and a content interaction component 645. Each of these modules may communicate, directly or indirectly, with one another (e.g., via one or more buses).

The content interface 610 may receive, at a first data management system, an identifier for at least one content item. In some examples, the content interface 610 may receive an indication of an updated version of the content item. In some cases, the at least one content item includes an image, a body of text, a product, a product description, a video, an advertisement, or a combination thereof.

The content object generation component 615 may generate a content object based on the at least one content item, where the content object includes one or more content fields corresponding to characteristics of the content item.

The API component 620 may transmit, using an application programming interface, the content object to a model configured to identify relationships between data stored at a second data management system.

The data object interface 625 may receive, from the second data management system, an identifier for at least one data object identified by the model of the second data management system as being associated with the at least one content item.

In some examples, the data object interface 625 may receive, from the second data management system, confidence scores associated with the at least one data object or associated with one or more categories associated with the at least one data object.

In some examples, the data object interface 625 may receive, from the second data management system, an identifier for at least one new data object based on the updated version of the content item. In some cases, the at least one data object includes a serializable object.

In some cases, the at least one data object includes a set of attributes and each value for each attribute of the set of attributes is associated with a product characteristic.

The filtering component 630 may filter the at least one data object or the one or more categories based on the confidence scores. The user interface 635 may receive, from a user, a selection of the at least one data object or one or more categories associated with the at least one data object.

The content distribution component 640 may distribute the content item and the identifier for the at least one data object to a set of client devices. The content interaction component 645 may receive, from at least one client device of the set of client devices, an indication of an interaction with the identifier for the at least one data object via the content item. In some cases, the first data management system is associated with a content management system.

Figure 7:
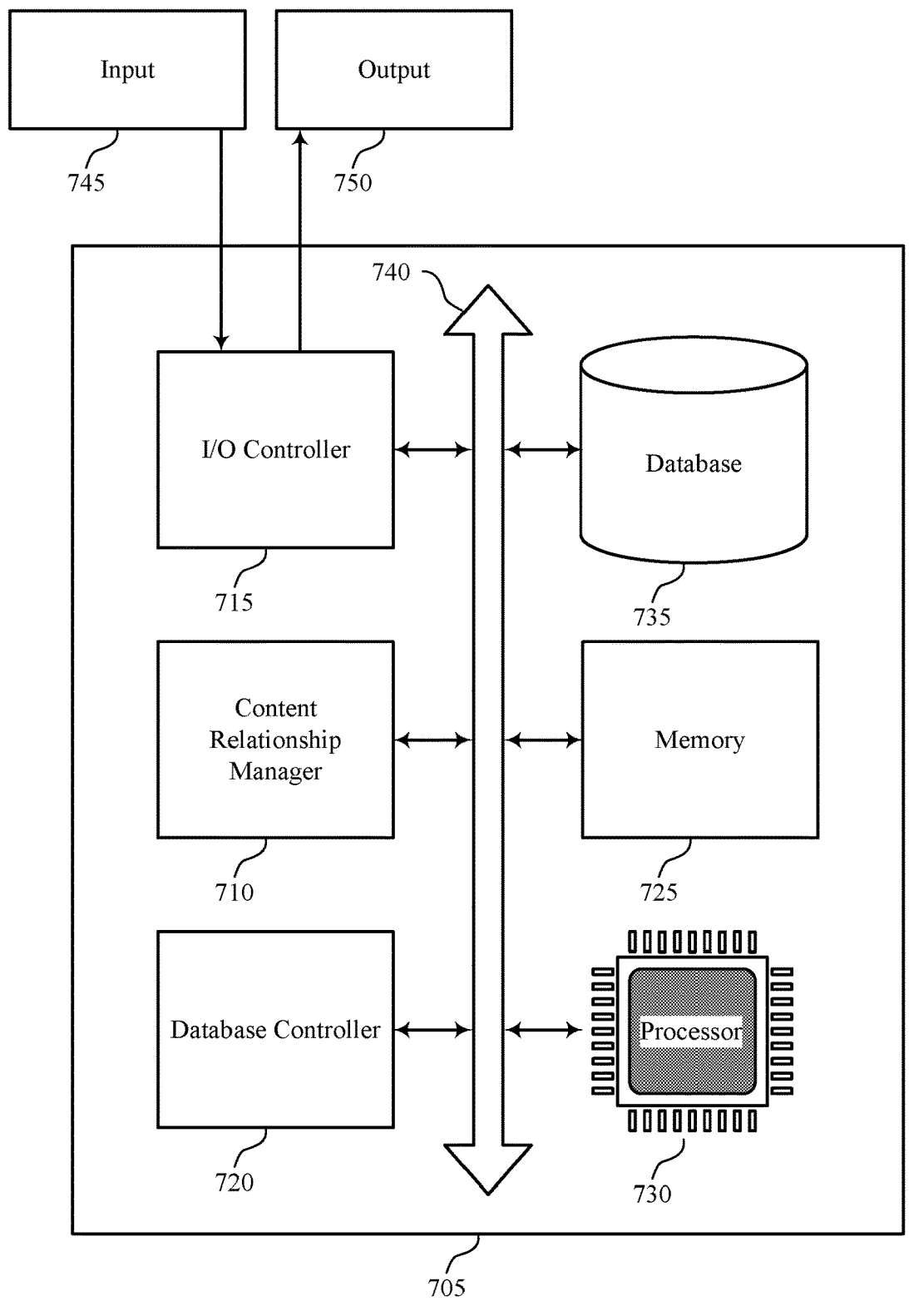
FIG. 7 shows a diagram of a system including a device that supports identifying associated data objects in accordance with aspects of the present disclosure.

FIG. 7 shows a diagram of a system 700 including a device 705 that supports identifying associated data objects in accordance with aspects of the present disclosure. The device 705 may be an example of or include the components of a data store or an apparatus 505 as described herein. The device 705 may include components for bi-directional data communications including components for transmitting and receiving communications, including a content relationship manager 710, an I/O controller 715, a database controller 720, memory 725, a processor 730, and a database 735. These components may be in electronic communication via one or more buses (e.g., bus 740).

The content relationship manager 710 may be an example of a content relationship manager 515 or 605 as described herein. For example, the content relationship manager 710 may perform any of the methods or processes described above with reference to FIGS. 5 and 6. In some cases, the content relationship manager 710 may be implemented in hardware, software executed by a processor, firmware, or any combination thereof.

I/O controller 715 may manage input and output signals for device 7705. I/O controller 715 may also manage peripherals not integrated into device 705. In some cases, I/O controller 715 may represent a physical connection or port to an external peripheral. In some cases, I/O controller 715 may utilize an operating system such as iOS®, ANDROID®, MS-DOS®, MS-WINDOWS®, OS/2®, UNIX®, LINUX®, or another known operating system. In other cases, I/O controller 715 may represent or interact with a modem, a keyboard, a mouse, a touchscreen, or a similar device. In some cases, I/O controller 715 may be implemented as part of a processor. In some cases, a user may interact with device 705 via I/O controller 715 or via hardware components controlled by I/O controller 715.

Database Controller 720 may manage data storage and processing in database 735. In some cases, a user may interact with database controller 720. In other cases, database controller 720 may operate automatically without user interaction. Database 735 may be an example of a single database, a distributed database, multiple distributed databases, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

Processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 730 may be configured to operate a memory array using a memory controller. In other cases, a memory controller may be integrated into processor 730. Processor 730 may be configured to execute computer-readable instructions stored in a memory to perform various functions (e.g., functions or tasks supporting identifying associated data objects).

Figure 8:
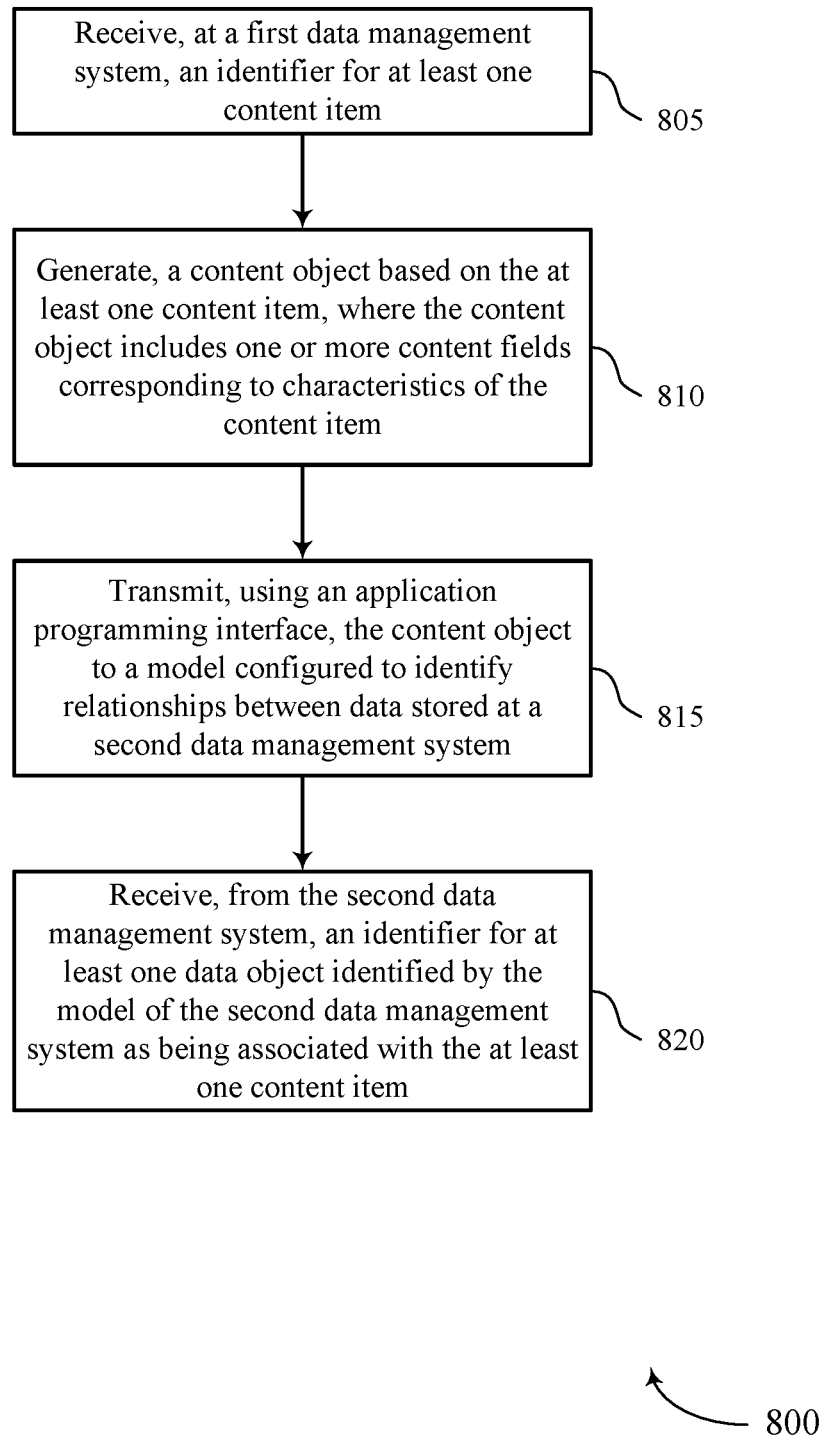
FIGS. 8 through 10 show flowcharts illustrating methods that support identifying associated data objects in accordance with aspects of the present disclosure.

FIG. 8 shows a flowchart illustrating a method 800 that supports identifying associated data objects in accordance with aspects of the present disclosure. The operations of method 800 may be implemented by a data store or its components as described herein. For example, the operations of method 800 may be performed by a content relationship manager as described with reference to FIGS. 5 through 7. In some examples, a data store may execute a set of instructions to control the functional elements of the data store to perform the functions described below. Additionally or alternatively, a data store may perform aspects of the functions described below using special-purpose hardware.

At 805, the data store may receive, at a first data management system, an identifier for at least one content item. The operations of 805 may be performed according to the methods described herein. In some examples, aspects of the operations of 805 may be performed by a content interface as described with reference to FIGS. 5 through 7.

At 810, the data store may generate a content object based on the at least one content item, where the content object includes one or more content fields corresponding to characteristics of the content item. The operations of 810 may be performed according to the methods described herein. In some examples, aspects of the operations of 810 may be performed by a content object generation component as described with reference to FIGS. 5 through 7.

At 815, the data store may transmit, using an application programming interface, the content object to a model configured to identify relationships between data stored at a second data management system. The operations of 815 may be performed according to the methods described herein. In some examples, aspects of the operations of 815 may be performed by an API component as described with reference to FIGS. 5 through 7.

At 820, the data store may receive, from the second data management system, an identifier for at least one data object identified by the model of the second data management system as being associated with the at least one content item. The operations of 820 may be performed according to the methods described herein. In some examples, aspects of the operations of 820 may be performed by a data object interface as described with reference to FIGS. 5 through 7.

Figure 9:
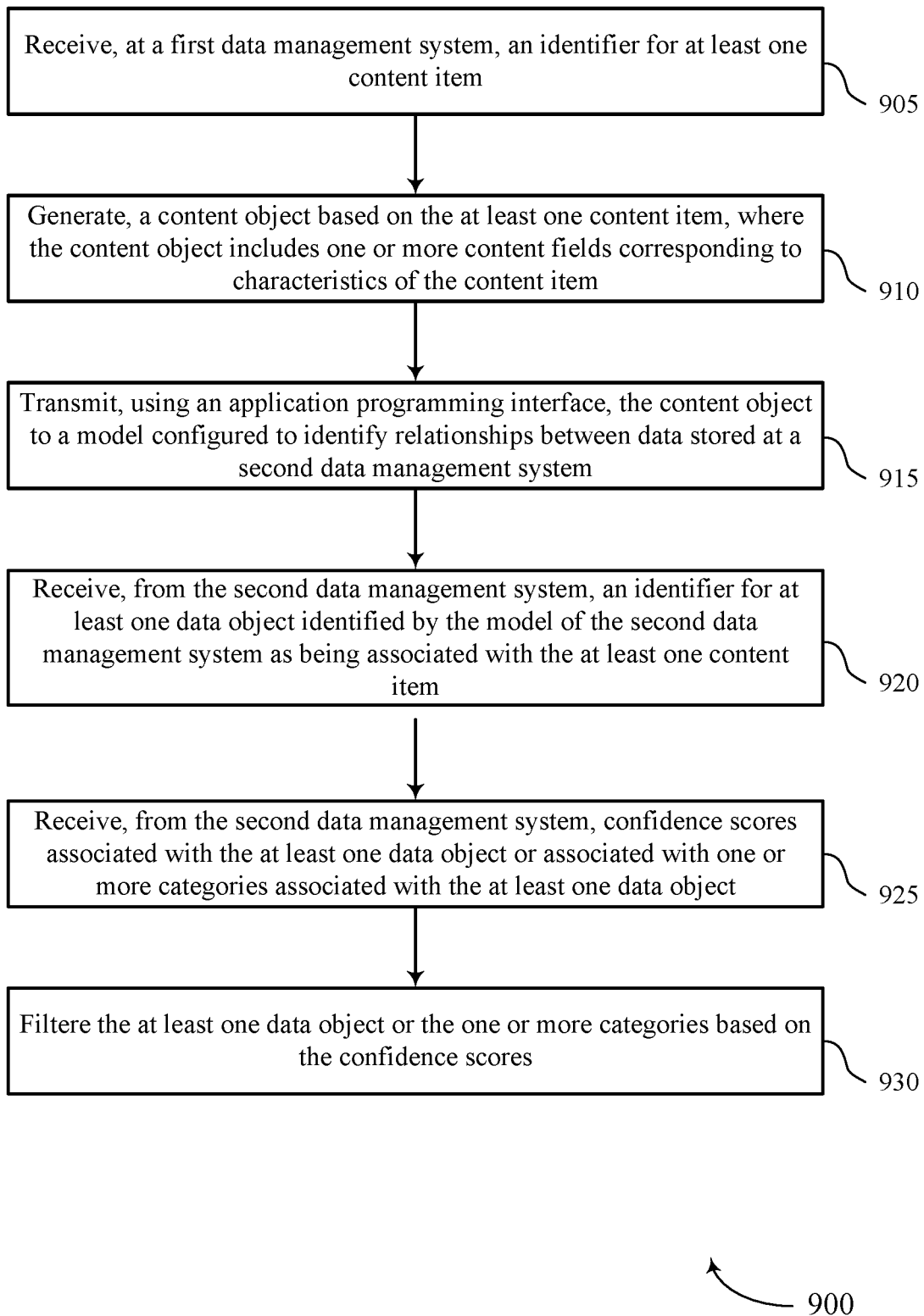

FIG. 9 shows a flowchart illustrating a method 900 that supports identifying associated data objects in accordance with aspects of the present disclosure. The operations of method 900 may be implemented by a data store or its components as described herein. For example, the operations of method 900 may be performed by a content relationship manager as described with reference to FIGS. 5 through 7. In some examples, a data store may execute a set of instructions to control the functional elements of the data store to perform the functions described below. Additionally or alternatively, a data store may perform aspects of the functions described below using special-purpose hardware.

At 905, the data store may receive, at a first data management system, an identifier for at least one content item. The operations of 905 may be performed according to the methods described herein. In some examples, aspects of the operations of 905 may be performed by a content interface as described with reference to FIGS. 5 through 7.

At 910, the data store may generate a content object based on the at least one content item, where the content object includes one or more content fields corresponding to characteristics of the content item. The operations of 910 may be performed according to the methods described herein. In some examples, aspects of the operations of 910 may be performed by a content object generation component as described with reference to FIGS. 5 through 7.

At 915, the data store may transmit, using an application programming interface, the content object to a model configured to identify relationships between data stored at a second data management system. The operations of 915 may be performed according to the methods described herein. In some examples, aspects of the operations of 915 may be performed by an API component as described with reference to FIGS. 5 through 7.

At 920, the data store may receive, from the second data management system, an identifier for at least one data object identified by the model of the second data management system as being associated with the at least one content item. The operations of 920 may be performed according to the methods described herein. In some examples, aspects of the operations of 920 may be performed by a data object interface as described with reference to FIGS. 5 through 7.

At 925, the data store may receive, from the second data management system, confidence scores associated with the at least one data object or associated with one or more categories associated with the at least one data object. The operations of 925 may be performed according to the methods described herein. In some examples, aspects of the operations of 925 may be performed by a data object interface as described with reference to FIGS. 5 through 7.

At 930, the data store may filter the at least one data object or the one or more categories based on the confidence scores. The operations of 930 may be performed according to the methods described herein. In some examples, aspects of the operations of 930 may be performed by a filtering component as described with reference to FIGS. 5 through 7.

Figure 10:
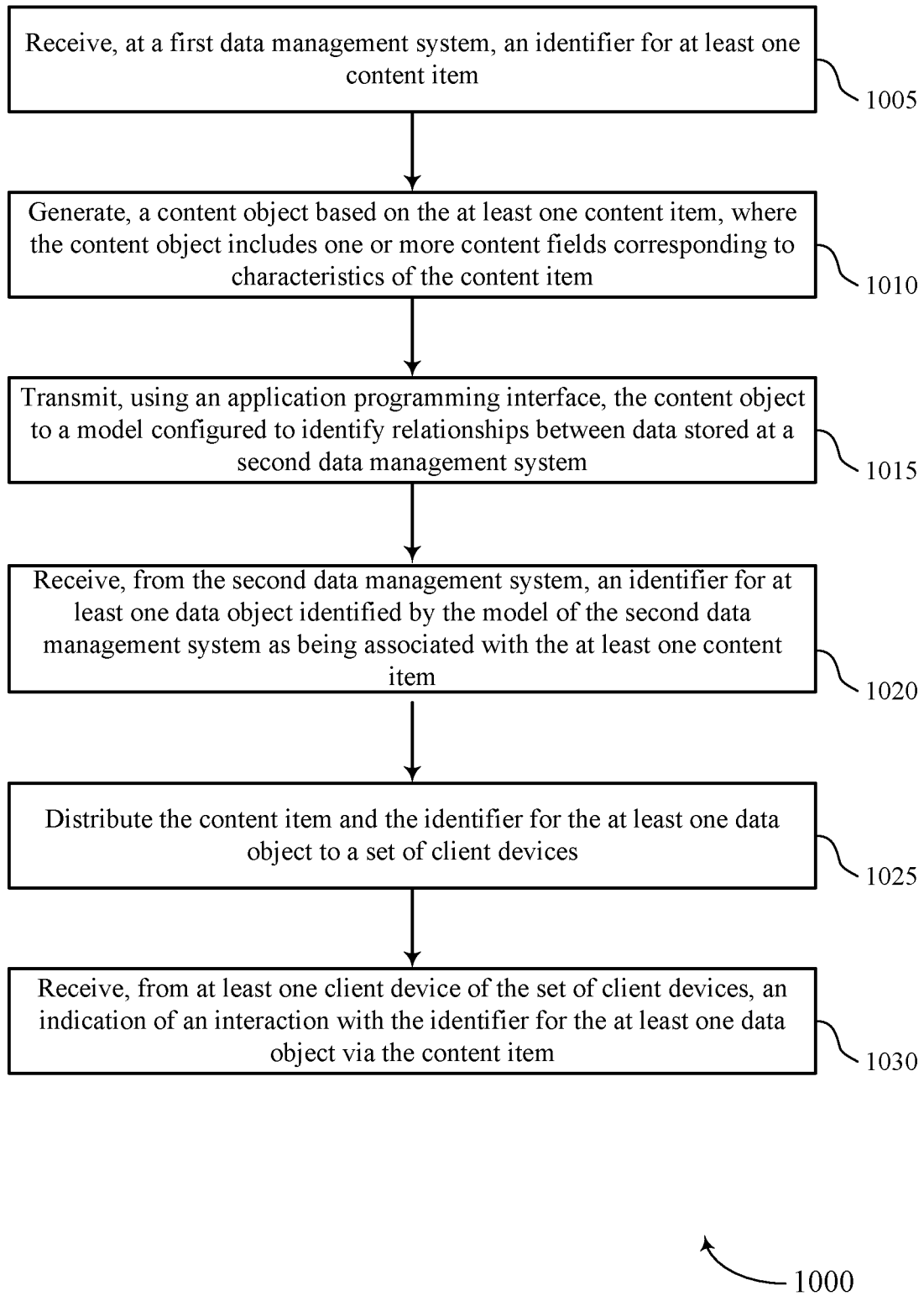

FIG. 10 shows a flowchart illustrating a method 1000 that supports identifying associated data objects in accordance with aspects of the present disclosure. The operations of method 1000 may be implemented by a data store or its components as described herein. For example, the operations of method 1000 may be performed by a content relationship manager as described with reference to FIGS. 5 through 7. In some examples, a data store may execute a set of instructions to control the functional elements of the data store to perform the functions described below. Additionally or alternatively, a data store may perform aspects of the functions described below using special-purpose hardware.

At 1005, the data store may receive, at a first data management system, an identifier for at least one content item. The operations of 1005 may be performed according to the methods described herein. In some examples, aspects of the operations of 1005 may be performed by a content interface as described with reference to FIGS. 5 through 7.

At 1010, the data store may generate a content object based on the at least one content item, where the content object includes one or more content fields corresponding to characteristics of the content item. The operations of 1010 may be performed according to the methods described herein. In some examples, aspects of the operations of 1010 may be performed by a content object generation component as described with reference to FIGS. 5 through 7.

At 1015, the data store may transmit, using an application programming interface, the content object to a model configured to identify relationships between data stored at a second data management system. The operations of 1015 may be performed according to the methods described herein. In some examples, aspects of the operations of 1015 may be performed by an API component as described with reference to FIGS. 5 through 7.

At 1020, the data store may receive, from the second data management system, an identifier for at least one data object identified by the model of the second data management system as being associated with the at least one content item. The operations of 1020 may be performed according to the methods described herein. In some examples, aspects of the operations of 1020 may be performed by a data object interface as described with reference to FIGS. 5 through 7.

At 1025, the data store may distribute the content item and the identifier for the at least one data object to a set of client devices. The operations of 1025 may be performed according to the methods described herein. In some examples, aspects of the operations of 1025 may be performed by a content distribution component as described with reference to FIGS. 5 through 7.

At 1030, the data store may receive, from at least one client device of the set of client devices, an indication of an interaction with the identifier for the at least one data object via the content item. The operations of 1030 may be performed according to the methods described herein. In some examples, aspects of the operations of 1030 may be performed by a content interaction component as described with reference to FIGS. 5 through 7.

A method of data processing is described. The method may include receiving, at a first data management system, an identifier for at least one content item, generating, a content object based on the at least one content item, where the content object includes one or more content fields corresponding to characteristics of the content item, transmitting, using an application programming interface, the content object to a model configured to identify relationships between data stored at a second data management system, and receiving, from the second data management system, an identifier for at least one data object identified by the model of the second data management system as being associated with the at least one content item.

An apparatus for data processing is described. The apparatus may include a processor, memory coupled with the processor, and instructions stored in the memory. The instructions may be executable by the processor to cause the apparatus to receive, at a first data management system, an identifier for at least one content item, generate a content object based on the at least one content item, where the content object includes one or more content fields corresponding to characteristics of the content item, transmit, using an application programming interface, the content object to a model configured to identify relationships between data stored at a second data management system, and receive, from the second data management system, an identifier for at least one data object identified by the model of the second data management system as being associated with the at least one content item.

Another apparatus for data processing is described. The apparatus may include means for receiving, at a first data management system, an identifier for at least one content item, generating, a content object based on the at least one content item, where the content object includes one or more content fields corresponding to characteristics of the content item, transmitting, using an application programming interface, the content object to a model configured to identify relationships between data stored at a second data management system, and receiving, from the second data management system, an identifier for at least one data object identified by the model of the second data management system as being associated with the at least one content item.

A non-transitory computer-readable medium storing code for data processing is described. The code may include instructions executable by a processor to receive, at a first data management system, an identifier for at least one content item, generate a content object based on the at least one content item, where the content object includes one or more content fields corresponding to characteristics of the content item, transmit, using an application programming interface, the content object to a model configured to identify relationships between data stored at a second data management system, and receive, from the second data management system, an identifier for at least one data object identified by the model of the second data management system as being associated with the at least one content item.

Some examples of the method, apparatuses, and non-transitory computer-readable medium described herein may further include operations, features, means, or instructions for receiving, from the second data management system, confidence scores associated with the at least one data object or associated with one or more categories associated with the at least one data object, and filtering the at least one data object or the one or more categories based on the confidence scores.

Some examples of the method, apparatuses, and non-transitory computer-readable medium described herein may further include operations, features, means, or instructions for receiving, from a user, a selection of the at least one data object or one or more categories associated with the at least one data object.

Some examples of the method, apparatuses, and non-transitory computer-readable medium described herein may further include operations, features, means, or instructions for distributing the content item and the identifier for the at least one data object to a set of client devices.

Some examples of the method, apparatuses, and non-transitory computer-readable medium described herein may further include operations, features, means, or instructions for receiving, from at least one client device of the set of client devices, an indication of an interaction with the identifier for the at least one data object via the content item.

In some examples of the method, apparatuses, and non-transitory computer-readable medium described herein, the at least one content item includes an image, a body of text, a product, a product description, a video, an advertisement, or a combination thereof.

In some examples of the method, apparatuses, and non-transitory computer-readable medium described herein, the at least one data object includes a serializable object.

In some examples of the method, apparatuses, and non-transitory computer-readable medium described herein, the at least one data object includes a set of attributes and each value for each attribute of the set of attributes may be associated with a product characteristic.

Some examples of the method, apparatuses, and non-transitory computer-readable medium described herein may further include operations, features, means, or instructions for receiving an indication of an updated version of the content item, and receiving, from the second data management system, an identifier for at least one new data object based on the updated version of the content item.

In some examples of the method, apparatuses, and non-transitory computer-readable medium described herein, the first data management system may be associated with a content management system.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   receiving, at a first data management system associated with a content management system, an identifier of at least one content item;
   generating a content object that includes one or more content fields corresponding to characteristics of the at least one content item, wherein a format of the content object corresponds to the format of data objects of a second data management system different from the first data management system, the data objects corresponding to products of an electronic commerce system associated with the second data management system, wherein the content object is generated to correspond to the format of a product of the electronic commerce system;
   transmitting, via an application programming interface, the content object to a machine learning model that is configured to identify relationships between the data objects of the second data management system;
   receiving, from the second data management system via the application programming interface, an indication of two or more data objects of the second data management system that are identified by the machine learning model as being related to the at least one content item of the first data management system; and
   transmitting, to a plurality of user devices, the at least one content item that includes links to the two or more data objects identified by the machine learning model configured for the second data management system.

2. The method of claim 1, further comprising:
   receiving, from the second data management system, confidence scores for the two or more data objects or confidence scores for categories associated with the two or more data objects; and
   filtering the two or more data objects or the associated categories based at least in part on the confidence scores.

3. The method of claim 1, further comprising:
   receiving, from a user of the first data management system, a selection of at least one data object of the two or more data objects from the second data management system or a selection of one or more categories associated with the at least one data object; and
   linking the at least one data object to the at least one content item based at least in part on the selection.

4. The method of claim 1, further comprising:
   receiving an indication that at least one user device of the plurality of user devices interacted with the links to the two or more data objects included with the at least one content item.

5. The method of claim 1, wherein the at least one content item comprises an image, a body of text, a product, a product description, a video, an advertisement, or a combination thereof.

6. The method of claim 1, wherein the two or more data objects comprise serializable objects.

7. The method of claim 1, wherein:
   the one or more content fields corresponding to the characteristics of the at least one content item comprise a title, a description, images, and multimedia information associated with the at least one content item; and the one or more content fields corresponding to the characteristics of the two or more data objects comprise an image attribute, a description attribute, and pricing information associated with the two or more data objects of the second data management system.

8. The method of claim 1, further comprising:
receiving, at the first data management system, an indication of an updated version of the at least one content item; and
receiving, from the second data management system, an identifier for at least one data object that corresponds to the updated version of the at least one content item.

9. The method of claim 1, further comprising:
identifying, at the second data management system, the two or more data objects based at least in part on using the machine learning model to process the content object, wherein processing the content object comprises cleaning the content object, converting the content object to the format of the data objects of the second data management system, and vectorizing the content object using a word embedding function.

10. The method of claim 1, wherein generating the content object comprises:
generating the content object that corresponds to the format of a product object of the electronic commerce system that is the second data management system such that the machine learning model of the electronic commerce system compares the content object to product objects of the electronic commerce system to identify the relationships between the content object and the product objects.

11. An apparatus for data processing, comprising:
a processor,
memory coupled with the processor; and
instructions stored in the memory and executable by the processor to cause the apparatus to:
receive, at a first data management system associated with a content management system, an identifier of at least one content item;
generating a content object that includes one or more content fields corresponding to characteristics of the at least one content item, wherein a format of the content object corresponds to the format of data objects of a second data management system different from the first data management system, the data objects corresponding to products of an electronic commerce system associated with the second data management system, wherein the content object is generated to correspond to the format of a product of the electronic commerce system;
transmit, via an application programming interface, the content object to a machine learning model that is configured to identify relationships between the data objects of the second data management system;
receive, from the second data management system via the application programming interface, an indication of two or more data objects of the second data management system that are identified by the machine learning model as being related to the at least one content item of the first data management system; and
transmit, to a plurality of user devices, the at least one content item that includes links to the two or more data objects identified by the machine learning model configured for the second data management system.

12. The apparatus of claim 11, wherein the instructions are further executable by the processor to cause the apparatus to:
receive, from the second data management system, confidence scores for the two or more data objects or confidence scores for categories associated with the two or more data objects; and
filter the two or more data objects or the associated categories based at least in part on the confidence scores.

13. The apparatus of claim 11, wherein the instructions are further executable by the processor to cause the apparatus to:
receive, from a user of the first data management system, a selection of at least one data object of the two or more data objects from the second data management system or a selection of one or more categories associated with the at least one data object; and
link the at least one data object to the at least one content item based at least in part on the selection.

14. The apparatus of claim 11, wherein the instructions are further executable by the processor to cause the apparatus to:
receive an indication that at least one user device of the plurality of user devices interacted with the links to the two or more data objects included with the at least one content item.

15. A non-transitory computer-readable medium storing code for data processing, the code comprising instructions executable by a processor to:
receive, at a first data management system associated with a content management system, an identifier of at least one content item;
generating a content object that includes one or more content fields corresponding to characteristics of the at least one content item, wherein a format of the content object corresponds to the format of data objects of a second data management system different from the first data management system, the data objects corresponding to products of an electronic commerce system associated with the second data management system, wherein the content object is generated to correspond to the format of a product of the electronic commerce system;
transmit, via an application programming interface, the content object to a machine learning model that is configured to identify relationships between the data objects of the second data management system;
receive, from the second data management system via the application programming interface, an indication of two or more data objects of the second data management system that are identified by the machine learning model as being related to the at least one content item of the first data management system; and
transmit, to a plurality of user devices, the at least one content item that includes links to the two or more data objects identified by the machine learning model configured for the second data management system.

16. The non-transitory computer-readable medium of claim 15, wherein the instructions are further executable to:
receive, from the second data management system, confidence scores for the two or more data objects or confidence scores for categories associated with the two or more data objects; and
filter the two or more data objects or the associated categories based at least in part on the confidence scores.

17. The non-transitory computer-readable medium of claim 15, wherein the instructions are further executable to:

receive, from a user of the first data management system, a selection of at least one data object of the two or more data objects from the second data management system or a selection of one or more categories associated with the at least one data object; and
link the at least one data object to the at least one content item based at least in part on the selection.

\* \* \* \* \*